(12) United States Patent
Mintz et al.

(10) Patent No.: US 8,356,775 B2
(45) Date of Patent: *Jan. 22, 2013

(54) SPACE OBJECT DEPLOYMENT SYSTEM AND METHOD

(75) Inventors: Nathan M. Mintz, Redondo Beach, CA (US); Mark R. Skidmore, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,628

(22) Filed: Dec. 10, 2010

(65) Prior Publication Data

US 2011/0089293 A1 Apr. 21, 2011

Related U.S. Application Data

(62) Division of application No. 11/980,252, filed on Oct. 30, 2007, now Pat. No. 7,967,257.

(51) Int. Cl.
*B64G 1/00* (2006.01)
*B64G 1/24* (2006.01)
(52) U.S. Cl. ...................... 244/173.3; 244/164
(58) Field of Classification Search ............... 244/164, 244/173.3, 158.1, 171.5, 172.4, 173.2, 173.1, 244/137.1, 137.4; 294/82.24, 82.26, 82.28, 294/82.36; 124/16, 26–29; 89/1.51, 1.701, 89/1.702; 102/377, 505, 340, 342, 293; 221/226, 221/279, 280; 222/494, 496
See application file for complete search history.

(56) References Cited

U.S. PATENT DOCUMENTS

| | | | |
|---|---|---|---|
| 3,143,965 | A | 8/1964 | Pointe |
| 4,015,507 | A | 4/1977 | Toy et al. |
| 4,181,062 | A | 1/1980 | Bernstein et al. |
| 4,506,852 | A | 3/1985 | Adams et al. |
| 6,126,115 | A | 10/2000 | Carrier |
| 7,373,886 | B2 | 5/2008 | Zatterqvist |

*Primary Examiner* — Joseph W Sanderson
(74) *Attorney, Agent, or Firm* — Christie, Parker & Hale, LLP

(57) ABSTRACT

Provided is a space object deployment system. Specifically, the system in at least one embodiment, includes at least one deployable object. A deployment chamber is paired with each deployable object, each chamber including: a base opposite from the deployable object; and a spring loaded countermass coupled to the base and slidably disposed within the chamber, the deployment chamber at least partially disposed within a rotatable body transverse to the axis of rotation. At least one coupler is paired to each deployable object and adapted to detachably couple the deployable object to the body and constrain the countermass within the chamber. An associated method of use is provided as well.

10 Claims, 6 Drawing Sheets

SPACE OBJECT DEPLOYMENT SYSTEM AND METHOD

FIELD AND CROSS-REFERENCE TO RELATED APPLICATION

This application relates generally to the field of release and deployment systems, and more specifically, to a space object deployment system. This application is a divisional which claims benefit under 35 USC, sec., 121, of co-pending U.S. Ser. No. 11/980,252 filed Oct. 30, 2007, the entire contents of which are incorporated herein by reference.

BACKGROUND

Satellites have become a key component in modern life. From telephone and TV transmission, weather reports, analysis of ocean currents and ground imaging, satellites are relied upon in many ways. Enjoyed by civilian applications, many satellites also provide military resources which are vital to national peace and security.

In addition to the orbiting operational satellites, there is a large quantity of debris, commonly called space junk, in orbit as well. There are also hostile forces in different geographic locations that may desire to destroy satellites, and recent anti-satellite missile tests have raised serious concern about the vulnerability of satellites and spacecraft in general.

Deployment of an object in space can be a complex issue. Newton's laws of motion teach, among other things, that for every action there is an equal and opposite reaction. In space, where a space vehicle acts to deploy an object from itself, a force applied to launch the object can and often will result in the space vehicle itself also being displaced from its original location.

As the deployed object typically has a much smaller mass then the space vehicle, the opposite reaction upon the space vehicle is somewhat reduced, but with repeated deployments minor displacements may aggregate into an issue of concern.

Two general options present themselves to address this. The first is to deploy an object with a very small force. By minimizing the force, the deployment is of course slow, but the opposite force against the deployment vehicle is further reduced.

Although this is effective to achieve the separation of the deployment object, it is hardly effective as a countermeasure launch system for defense against approaching space junk or an incoming missile where speed to intercept may be at issue. Indeed if high velocity is desired for the deployed object, it is necessary to equip the deployed object with its own means of propulsion. This may well increase the cost and complexity of the deployed object in undesired ways.

The second is to provide yet another equal and opposite force, such as by deploying objects symmetrically. If objects of equal mass are deployed in opposite directions from the space vehicle, the opposite reactionary forces will cancel. As it is rather unlikely that two objects are desired in opposite directions of employment, one object is truly sacrificial, which likely increases costs as well as contributing to the growing field of space junk. Such a system is technically challenging. If the deployments are even slightly out of synchronization, the effect of opposing forces will not properly cancel and indeed opposing sheer forces may be quite damaging to the space vehicle.

As opposed to symmetrically deploying a sacrificial mass, thrusters may also be used to apply an opposite force to maintain the position and stability of the space vehicle. Here again, the operation of the thrusters must be precise so as to not adversely affect the deployment of the object in the intended direction and/or cause sheer stress to the space vehicle.

If it is desired to deploy multiple objects nearly simultaneously, the issue of applying and controlling equal and opposite force becomes even more technically challenging. If it is desired to deploy the multiple objects on different trajectories, the equal and opposite force control becomes even more complex and challenging. The issue of where on the space vehicle the deployment object is may also factor into the equation and problems of stability control, for if the thrusters are located at either end of the space vehicle, but the object is deployed from the middle or any point not directly in line with opposing thrusters, the control of multiple thrusters will be required.

The use of thrusters of course requires the use of a propellant which is expended in the counter force maneuver. Factors such as weight, internal space, dollar cost, and finite supply do impose limitations on how much and how often counter thrust may be used in deployment systems.

When, as suggested above, the deployed object is intended as a counter measure against space debris, an incoming missile, or other object, speed of deployment and velocity upon deployment may be highly critical issues. Although most space vehicles are of course designed to withstand the stress of ground launch, periodic sheer stresses can be more difficult to anticipate and control. Complex systems to maintain center of mass for the deploying space vehicle and overall vehicle stability introduce greater overall system complexity and at least increase the number of possible points of failure.

Moreover, despite various prior art attempts, space based deployment systems and methods currently do not offer effective options for high velocity deployment, let alone a simplistic system and method for same. Hence, there is a need for a space object deployment system that overcomes one or more of the issues and problems identified above.

SUMMARY

This invention provides a space object deployment system and associated method.

In particular, and by way of example only, according to one embodiment of the present invention, provided is a space object deployment assembly. The assembly has a housing having a longitudinal axis of rotation. At least one deployment chamber disposed at least partially within the housing perpendicular to the longitudinal axis. The chamber includes: a first end; a spring disposed adjacent to the first end; and a countermass coupled to the spring opposite from the first end. A deployable object is provided proximate to the countermass. At least one coupler is paired with the deployable object and deployment chamber, each coupler adapted to detachably couple the deployable object to the housing and constrain the countermass and the spring. The housing is selectably rotatable about the longitudinal axis of rotation.

In yet another embodiment, provided is a space object deployment system. The assembly includes at least one deployable object and a deployment chamber paired with each deployable object. Each chamber includes: a base opposite from the deployable object; a spring loaded countermass coupled to the base and slidably disposed within the chamber. The deployment chamber at least partially disposed within a rotatable body transverse to the axis of rotation. At least one coupler paired to each deployable object and adapted to detachably couple the deployable object to the body and constrain the countermass within the chamber.

Further still in yet another embodiment, provided is a method of space object deployment, comprising: providing a deployment assembly having a housing with a longitudinal axis of rotation; at least one deployable object paired with a chamber, the chamber including: a base opposite from the deployable object; a spring loaded countermass coupled to the base and slidably disposed within the chamber, and a restrainer structured and arranged to restrain the countermass at a predetermined distance after deployment, the deployment chamber at least partially disposed within a the housing transverse to the axis of rotation; and at least one coupler paired to each deployable object and adapted to detachably couple the deployable object to the housing and constrain the countermass within the chamber; rotating the deployment assembly about the longitudinal axis of rotation to a selected velocity, the deployment assembly having a center of mass in harmony with a center of rotation about the longitudinal axis of rotation; detaching the deployable object from the deployment assembly, the rotational velocity translating to linear velocity to carry the deployable object away from the countermeasure deployment assembly; and automatically expanding the spring and attached countermass to maintain the harmony of center of rotation and center of mass.

DETAILED DESCRIPTION

Before proceeding with the detailed description, it is to be appreciated that the present teaching is by way of example only, not by limitation. The concepts herein are not limited to use or application with a specific system or method for space object deployment. Thus, although the instrumentalities described herein are for the convenience of explanation, shown and described with respect to exemplary embodiments, it will be appreciated that the principles herein may be applied equally in other types of systems and methods involving missile space object deployment.

Figure 1:
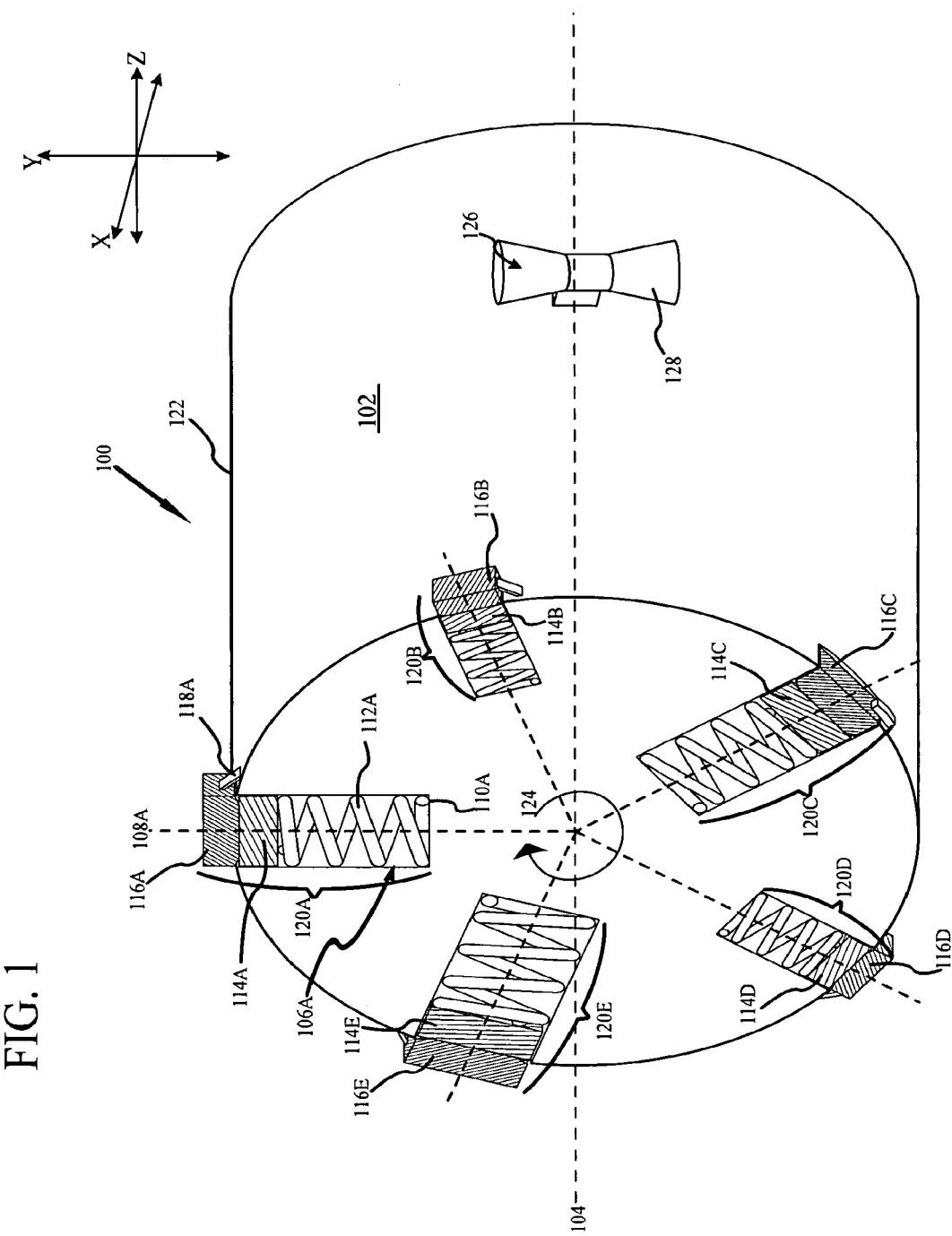
FIG. 1 is a partial cut away perspective view of a space object deployment assembly in accordance with at least one embodiment.

Turning now to the figures, and more specifically to FIG. 1, there is shown a space object deployment assembly ("SODA") 100 in accordance with at least one embodiment. To facilitate the description, the orientations are referenced to the coordinate system with three axes orthogonal to one another, as shown in FIG. 1. The axes intersect mutually at the origin of the coordinate system which is intended to be the center of the SODA 100. The axes shown in all figures are offset from their actual locations for clarity of illustration. Moreover, FIG. 1 is understood to be a perspective view of the SODA 100.

As shown, SODA 100 has a housing 102 and a longitudinal axis of rotation 104, the longitudinal axis intended to be the Z-axis. As is further described below, the housing 102, or body as may also be known, is a rotatable body 102. Disposed at least partially within the housing 102 is at lest one deployment chamber 106, of which deployment chamber 106A is exemplary. As indicated, by radial line 108A, deployment chamber 106A is perpendicular to the longitudinal axis 104.

Chamber 106A includes a first end 110A and a spring 112A disposed adjacent to the first end. First end 110A is in at least one embodiment considered a base for spring 112A. A countermass 114A is coupled to the spring opposite from the first end 110A. As is further described below, the countermass 114A is sized to slide within chamber 106A.

Deployable object 116A is proximate to the countermass 114A, and in at least one embodiment is in physical contact, with countermass 114A. At least one coupler 118A is paired with the deployable object 116A and the deployment chamber 106A. The coupler 118A is adapted to detachably couple the deployable object 116A to the housing 102 and constrain the countermass 114A and spring 112A within deployment chamber 106A.

More specifically, the spring 112A is a loaded spring, such as a coil spring exerting a force against countermass 114A. The spring 112A is maintained in a loaded state by the coupler 118A which is maintaining deployable object 116A in a state attached to the housing 102, thereby restraining the countermass 114A and spring 112A.

To summarize, in at least one embodiment, the deployment assembly consists of at least one deployable object 116A paired with a deployment chamber 106A at least partially disposed in a rotatable body. Deployment chamber 106A provides a base, e.g., first end 110A, opposite from the deployable object 116A and a spring loaded countermass 114A coupled to the base 110A and slideably disposed within the chamber 106A. Paired deployable object 116A and deployment chamber 106A also has at least one coupler adapted to detachably couple the deployable object to the rotatable body 102.

In at least one embodiment, SODA 100 includes a plurality of paired deployment chambers 106A and deployable objects 116A (e.g., pair 120A), such as the five pairs shown in FIG. 1, 120A, 120B, 120C, 120D and 120E. As shown, in at least one embodiment the plurality of pairs 120A~120E are asymmetrically positioned about the longitudinal axis 104. More specifically, no two pairs are directly opposite from each other.

In addition, as is illustrated by size, the mass of deployable object 116E is greater than the mass of each deployable objects 116A~116D respectively in at least one embodiment. In other words, in at least one embodiment, at least two deployable objects (e.g., deployable object 116E and deployable object 116B) have different mass. Likewise the mass, illustrated by size, of countermass 114E is greater than the mass of each countermass 114A~114D respectively.

Further still, whereas in at least one embodiment, the deployable object 116 (e.g., deployable object 116A) extends above the surface 122 of the housing 102, in at least one alternative embodiment the deployable object 116 (e.g., deployable object 116C) is disposed within the deployment chamber 106C below the surface 122 of the housing 102. In yet another alternative embodiment, such as that depicted in FIG. 1, a mixture of deployable objects above and below the surface 122 of the housing 102 are provided.

As indicated by arrow 124, the housing 102 is rotatable about longitudinal axis 104. Further still, the speed of rotation is selectable and may be changed from one deployment operation to another. In at least one embodiment, the rotation of the housing 102 is achieved by at least one rotator 126 structured and arranged to cause rotation of the housing 102 about the longitudinal axis 104. More specifically the rotator 126 may be an appropriately selected device such as the illustrated thruster 128, an internal momentum wheel (not shown), or other appropriate device suitable for imparting rotation to a housing 102 in space.

Figure 2:
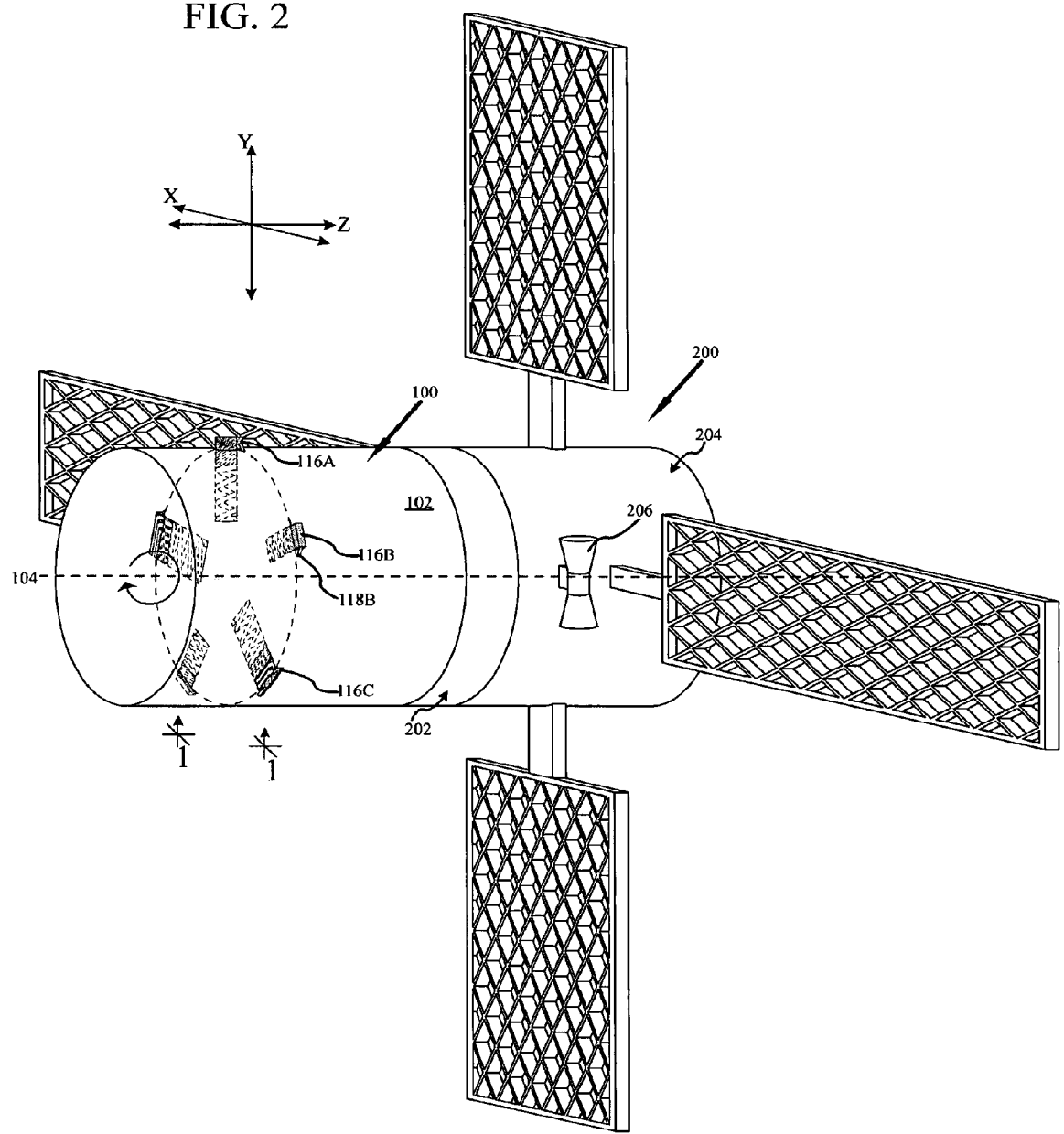
FIG. 2 illustrates the space object deployment assembly of FIG. 1 as a satellite, or as coupled to a satellite in varying embodiments.

As shown in FIG. 2, in at least one embodiment, SODA 100, and more specifically the housing 102 is part of a rotatable satellite 200. In one embodiment, the housing is contiguous between the SODA 100 components and the overall satellite, such that the satellite itself may be described as a SODA satellite.

In at least one alternative embodiment, SODA 100 includes a coupler 202 adapted to couple the housing 102 of SODA 100 to a pre-existing satellite housing 204. In at least one embodiment, the coupler 202 is a V-band clamp. In such embodiments where SODA 100 is a coupled to a pre-existing satellite, it is understood and appreciated that SODA 100 may utilize the satellite rotator(s) 206 for conservation of components and resources.

SODA 100 is operational to advantageously maintain a constant moment of inertia. In other words, when initially rotated, SODA 100 has a center of mass collocated upon the center of rotation (e.g., the longitudinal axis 104). SODA 100 is advantageously operational to deploy deployable objects 116 at varying velocities while maintaining the harmony between the collocated center of rotation and center of mass. Such harmony is advantageously achieved and maintained without the use of opposite force systems. This advantageous ability is further illustrated in FIGS. 3 and 4 and the flow diagram of FIG. 5.

Figure 3:
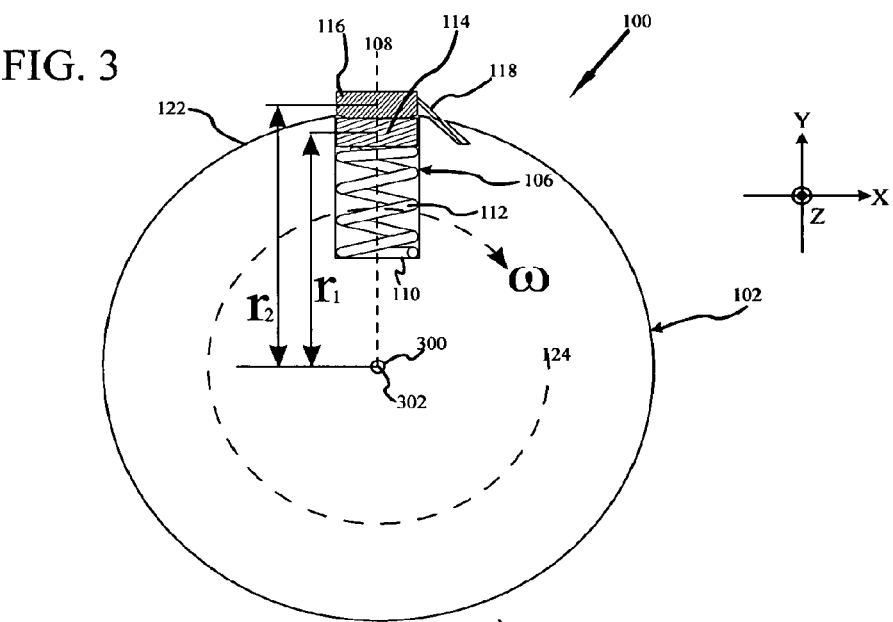
FIG. 3 is a cut through illustration of a single deployment chamber and deployable object as shown in FIG. 1, pre-deployment.

FIG. 3 provides a cross sectional view of SODA 100 with respect to the YX plane, the Z-axis aligned to the axis of rotation 104. As is more fully appreciated with respect to FIGS. 3 and 4. SODA 100 achieves deployment of the deployable object by way of centripetal force.

Figure 5:
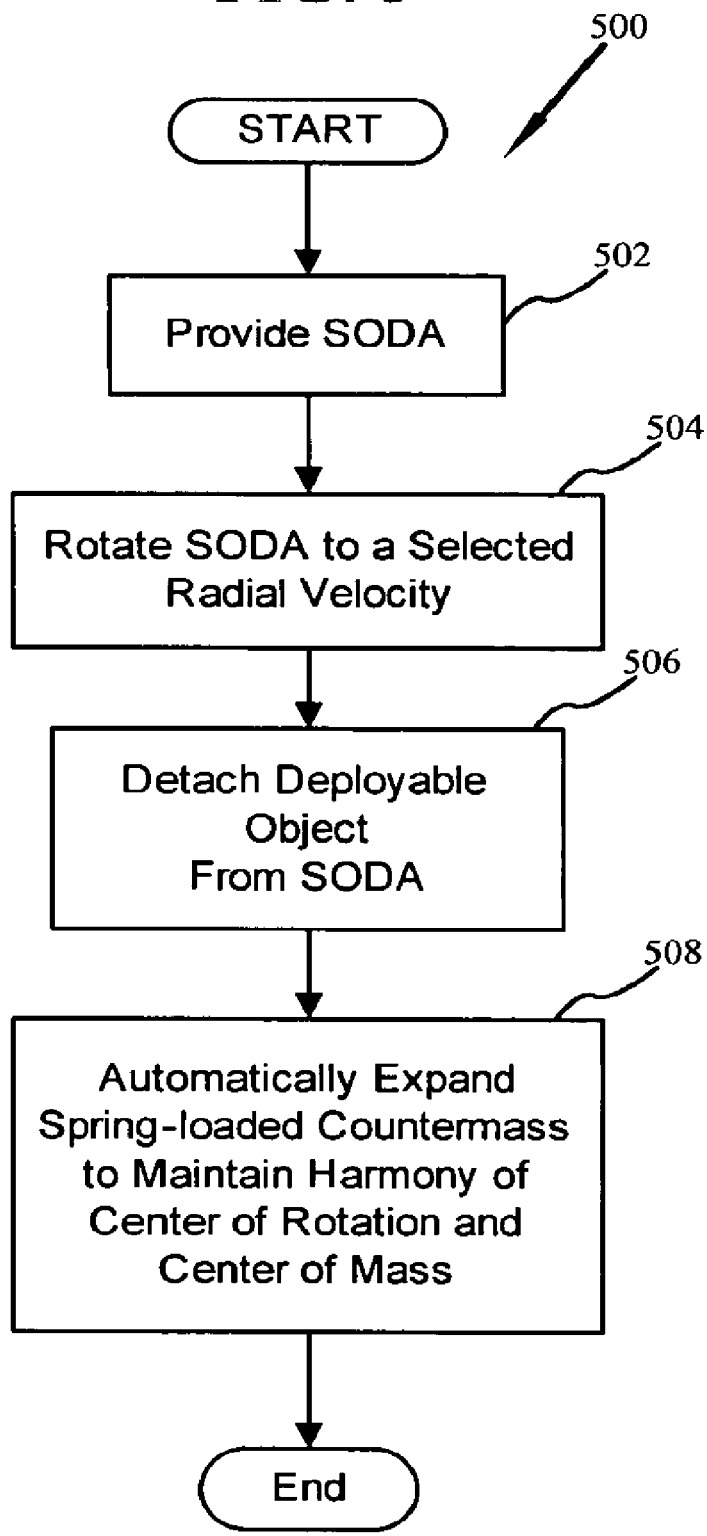
FIG. 5 is a flow diagram illustrating at least one method of deploying an object in accordance with the space object deployment system.

With respect to the method 500 of providing space object deployment presented in FIG. 5, it is of course understood and appreciated that the method need not be performed necessarily in the order herein described. Rather this is at least one method 500 for space object deployment for use in connection with the present invention of SODA 100 as shown and described herein. For at least one embodiment of the method 500, method of providing space object deployment commences with the providing of a SODA 100, block 502.

As shown in FIG. 3, the housing is rotating at radial velocity ω, block 504. SODA 100 may utilize the thrusters or other rotator device to achieve a desired speed of rotation for deployment. It is to be specifically understood and appreciated that the speed of rotation is fully adjustable and may vary from one deployment to the next.

In the initial state of attachment, maintained while coupler 118 is engaged, the distance of the deployable object is $r_2$ as measured from the center of rotation. The distance of the countermass 114 is $r_1$ as measured from the center of rotation 300. In this initial state, by definition, the center of mass 302 is collocated with the center of rotation 300. The spring 112 is also shown in a state of compression.

Figure 4:
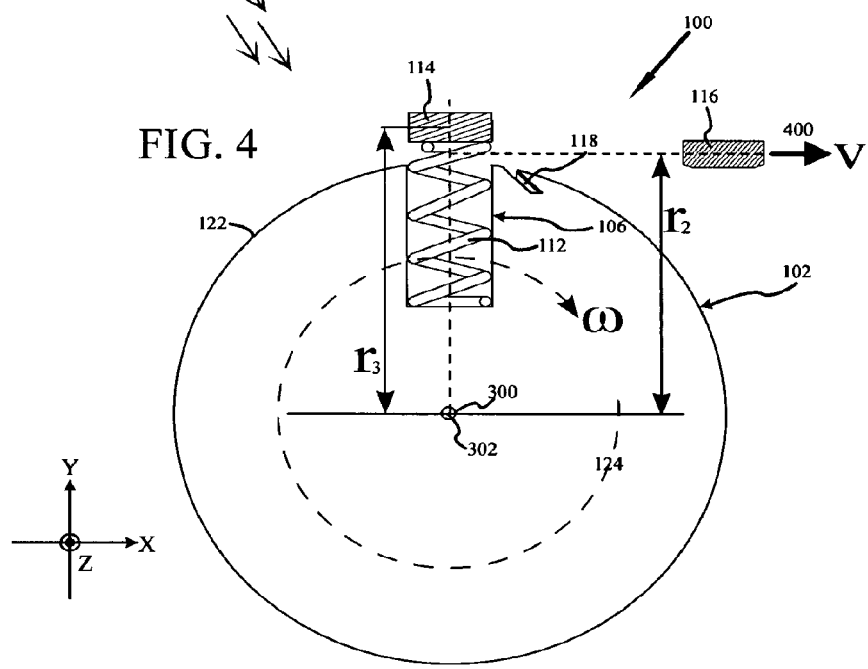
FIG. 4 is a cut through illustration of a single deployment chamber and deployable object as shown in FIG. 3, after deployment.

Having obtained the desired radial velocity, the release of coupler 118 (such as by retraction as shown) is activated at such an appropriate time so as to permit the deployable object to continue along a tangential path 400 towards a desired object, see FIG. 4 and block 506 of FIG. 5. Moreover, the radial velocity applied during attachment is translated to linear velocity upon release. A wide variety of couplers, may be employed including, but not limited to, pin connectors, magnetic fields, or latches.

Upon the release of the deployable object 116, the center of mass of SODA 100 will attempt to shift. At high rates of revolution such a shift would traditionally result in a separation of the center of rotation 300 from the center of mass 302, an event that would introduce potentially deleterious stress effects. SODA 100 advantageously counteracts such a shift through the use of the spring loaded countermass 114. In other words, the spring loaded countermass 114 acts to counteract the attempted shift of the center of mass upon release of the deployable object 116. Though there may in some situations be a small and momentary offset of the center of mass, the harmony is so quickly restored that potentially deleterious stresses are effectively eliminated.

As shown in FIG. 4, upon release of the deployable object 116, the spring automatically acts to expand such that countermass 114 moves to a new distance of is $r_3$ as measured from the center of rotation, block 508. This new distance $r_3$ is the proportional distance necessary to offset change in the center of mass. This action maintains the center of mass along the axis of rotation and maintains the uniform spin.

As shown in FIG. 4 the new distance $r_3$ is such that countermass 114 is now above the surface 122 of housing 102. Whereas in FIG. 3, deployable object 116 is shown in one embodiment being disposed such that it extends above the surface 122 of the housing 102, in at least one alternative embodiment, such as pair 120C in FIG. 1, the deployable object 116C is disposed within the chamber 106C. This alternative embodiment is further illustrated in FIG. 6.

Further, in at least one alternative embodiment, a restrainer 600 is provided, the restrainer being structured and arranged to limit the maximum extension of the spring following deployment. As is set forth below, balanced equations are employed to calculate the relationships between the mass of the deployable object 116, the countermass 114, the spring 112, and the initial and final distances of the spring 112 and countermass 114 from the center axis of rotation 104. To maintain the harmony between the center of mass and the center of rotation, the countermass is not permitted to pull to a distance greater than the intended $r_3$.

In at least one embodiment, this limitation is imposed by the spring 112 itself, the spring 112 designed to incorporate a restrainer so as to have a maximum distance of deployed extension. In at least one alternative embodiment this restriction is imposed by a cable existing between the first end 110 and the countermass 114 (not shown). In yet another embodiment, the restrainer is a breaking or limiting device such as an actuating pin 602, either within the countermass 114 or, as shown, as part of the chamber 106 such that in the countermass 114 can be affixed in its new location following the deployment of the deployable object 116. In yet another embodiment, the countermass 114 and chamber are shaped such that the counter mass can not move past a specific point, the countermass 114 initially held back from that specific point by the presence of the deployable object 116.

Figure 6:
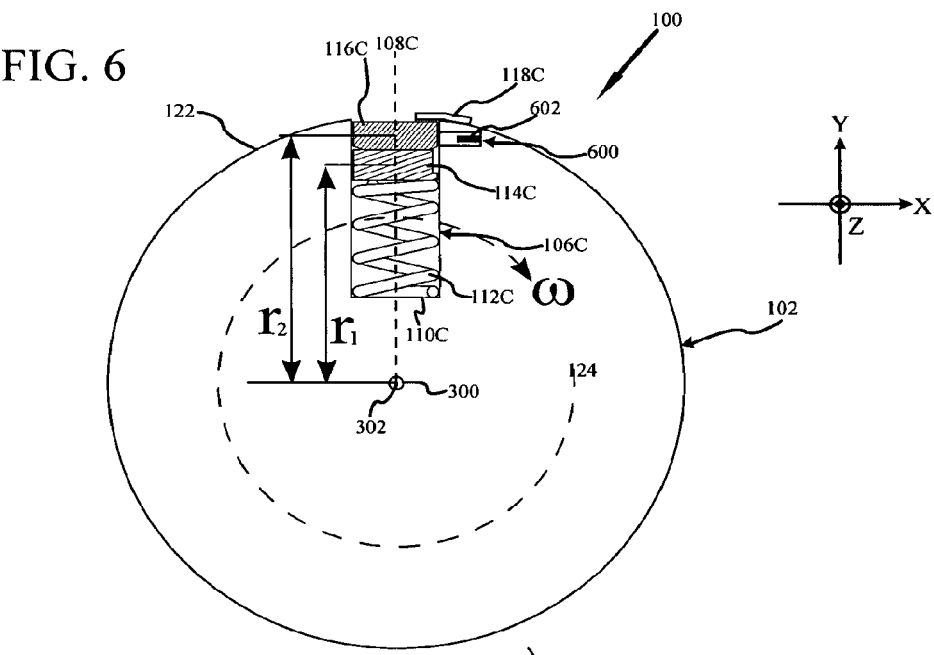
FIG. 6 is a cut through illustration of a single alternative deployment chamber and deployable object as shown in FIG. 1, pre-deployment.
Figure 7:
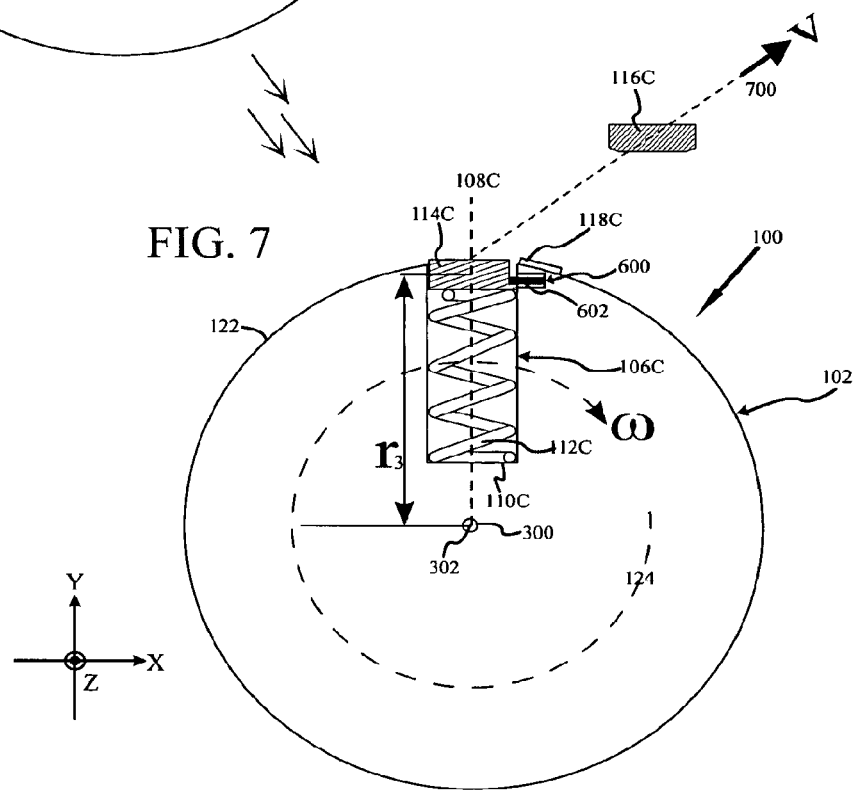
FIG. 7 is a cut through illustration of the single deployment chamber and deployable object as shown in FIG. 6, after deployment.

With respect to the embodiment shown in FIG. 6, upon release of the coupler 118C, the expansive force of the spring will initially push deployable object 116C out of the chamber 106C before the deployable object 116C moves away along a tangent due to centripetal force. With respect to FIG. 4 showing the deployable object 116 moving along path 400, the alternative embodiment shown in FIG. 6 results in FIG. 7, wherein the deployable object 116C departs along path 700. In addition, as shown in FIG. 7, the countermass 114C has moved to its new location. In addition, the actuating pin 602 has engaged the countermass 114C to lock it in the new position.

Indeed, due to the speed of the expansion of spring 112, in certain embodiments the tangent path taken by deployable object 116 originally extending above outer surface 122 may be at an angle relative to path 400 of FIG. 4. It is of course understood and appreciated that the expansion speed of the spring may be calculated and incorporated into the determination of timing for release so as to insure that the deployable object 116 is released on an intended path.

It is of course understood and appreciated that for a uniform spin, in initial configuration SODA 100 is a balanced assembly. With respect to FIGS. 1 and 2 illustrating asymmetric placement of paired deployment chambers 106 and deployable objects 116 the asymmetric placement and varying masses of the deployable objects 116 and countermasses 114 may be selected to achieve balance, or in an alternative embodiment, internal components or specific mass objects may be specifically located within SODA 100 to achieve the initial balance. The principle issue being that once initially balanced, SODA 100 remains balanced and operable to maintain uniform spin regardless of which deployable objects 116 are deployed and/or the rotational velocity at their time of deployment. Indeed, SODA 100 remains balanced and operable to maintain uniform spin before and after deployment without the use of equal and opposite force system.

To accomplish and maintain this advantageous harmony between the center of mass and the center of rotation, several elements are of course involved. Specifically:

mass of the deployable object $116 = M_{initObj}$;
mass of the countermass $114 = M_{c-mass}$
mass of the spring $112 = M_{spring}$
initial distance of the countermass $114 = Dis_{c-mass-stowed}$
initial distance of the deployable object $116 = Dis_{initObj}$
deployed distance of the countermass $114 = Dis_{c-mass-deployed}$ For these equations, it is understood and appreciated that the restrainer 600 is either as the pin system shown in FIGS. 6 and 7, or an incorporated element of the spring itself as in FIGS. 3 and 4. With respect to FIGS. 3 and 4, $Dis_{c-mass-stowed} = r_1$, $Dis_{initObj} = r_2$, $Dis_{c-mass-deployed} = r_3$.

With respect to $Dis_{Spring-stowed}$, it is to be realized that for completeness, the formula present this element. However, the initial stowed distance of the spring is approximately equal to the distance of the countermass when stowed, and may be considered so in these equations. Moreover, $Dis_{Spring-stowed} = Dis_{c-mass-stowed}$ for the purposes of at least one embodiment.

Based on these values, equations are applied to determine the spring constant k for proper selection of an appropriate spring 112. In at least one embodiment, this is determined by establishing an equation to sets forth the relationship between the initial and deployed states of the involved elements.

$$Dis_{initObj} \times M_{initObj} + Dis_{spring-stowed} \times (M_{c-mass} + 0.5 M_{spring}) = Dis_{spring-deployed} \times (M_{c-mass} + 0.5 M_{spring})$$

To determine $Dis_{Spring-deployed}$ the equation is rewritten as Equation 1:

$$Dis_{spring-deployed} = \frac{Dis_{initObj} \times M_{initObj} + Dis_{spring-stowed} \times (M_{c-mass} + 0.5 M_{spring})}{(M_{c-mass} + 0.5 M_{spring})}$$

With $Dis_{Spring-deployed}$ known, the spring constant k is determined in at least one embodiment with Equation 2.

$$k = \frac{(M_{c-mass} + M_{spring}) \times Dis_{spring-deployed} \times \omega^2}{(Dis_{c-mass-deployed} - Dis_{c-mass-stowed})}$$

These values are demonstrated with an exemplary embodiment wherein: $M_{initObj} = 10$ kg, $M_{c-mass} = 5$ kg, $M_{spring} = 0.5$ kg, $Dis_{Spring-stowed} = 0.45$ m, $Dis_{initObj} = 0.5$ m. These values when applied through Equation 1 provide $Dis_{Spring-deployed} = 1.402381$ m. Now applying Equation 2, k is determined to be 31940.17 N/m The velocity, v, of the deployable object 116 upon deployment is of course determined by Equation 3.

$$v = Dis_{initObj} \times \omega$$

For the above exemplary values, and $\omega = 62.8$ rad/s, v is 31.4 m/s.

Figure 8:
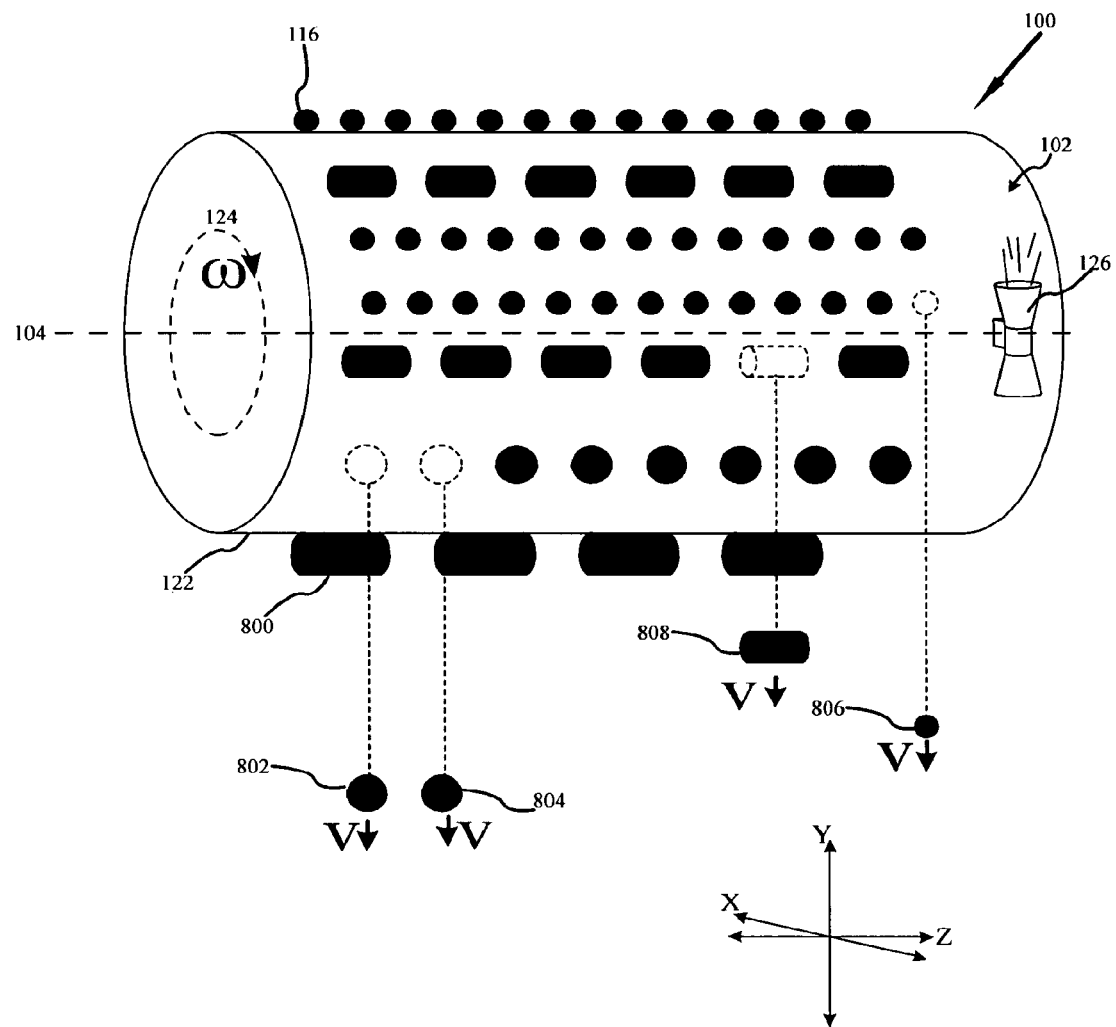
FIG. 8 is a perspective view of a space object deployment system providing a plurality of different deployable objects in accordance with at least one embodiment.

FIG. 8 is a perspective view of SODA 100 provided with a plurality of different deployable objects 116. Indeed, it is understood and appreciated that deployable objects 116 may be simple objects such as solid spheres, cubes or other blocks of material.

The deployable objects 116 may also fragment into a plurality of smaller objects upon deployment from the SODA 100 assembly, thereby providing an even greater field of flack like material. Deployable objects 116, whether simple or complex devices, may be considered as microsatellites in that they are each understood and appreciated to have mass that is less than the mass of the SODA 100 support structure (e.g. the SODA satellite).

It is also understood and appreciated that this system and method for space object deployment need not be limited to small simple objects. Indeed the deployable object 116 may be a space probe or planetary landing craft. Rather than launching the probe with sufficient fuel for the entire journey, mission costs may be improved by combining multiple missions with a single SODA 100 and a single ground lift off. In space orbit, SODA 100 can effectively deploy the one or more probes towards their respective mission targets.

Deployable objects 116 may also be more complex defensive devices such as in at least one embodiment being a decoy device 800. More specifically, in at least one embodiment, at least one deployable object 116 is a quartz crystal tube with a diffuse thermite core, similar in size and shape to a stick of dynamite.

Ignited by a potassium permanganate/glycerine trigger, the thermite core will provide thermal energy that will be either radiated into space or absorbed by the quartz crystal tube, which will continue to radiate IR radiation long after the reaction has been exhausted. Moreover, the decoy device 800 is intended to mimic the IR signature of a satellite such that the decoy device 800 will provide an attractive thermal signature to an incoming missile and thereby safeguard the true satellite.

Regardless of their simplicity or complexity, offensive, defensive or passive nature, it is again understood that SODA 100 is accomplishing space object deployment without the traditional equal and opposite force reaction. As such, SODA 100 advantageously enjoys the ability to perform deployment at both slow and fast velocities and to vary velocity deployment from one to another.

FIG. 8 further illustrates that multiple deployable objects (e.g., deployable objects 802, 804) may be deployed substantially simultaneously, as indicated by the dotted lines tracing back to original positions upon housing 102. In addition to simultaneous deployment, it is also to be noted that deployable objects 802, 804 originated from the same general area of housing 102. FIG. 8 also demonstrates the deployment of deployable objects having different size and/or mass (e.g., deployable object 806 as compared to deployable object 808).

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of deploying at least one deployable object in space, the method comprising:
    providing a space object deployment assembly (SODA) comprising the at least one deployable object contained therein;
    rotating the SODA to a selected radial velocity;
    after achieving said selected radial velocity, detaching the at least one deployable object from the SODA; and
    responsive to said detaching, expanding a spring-loaded countermass in the SODA to maintain harmony of a center of rotation and a center of mass of the SODA without using an opposite force system.

2. The method of claim 1, further comprising, after said detaching and during said expanding, restraining the spring-loaded countermass at a predetermined distance from the center of rotation of the SODA so as to maintain said harmony.

3. The method of claim 1, wherein the spring-loaded countermass is coupled to a housing of the SODA and slidably disposed within a chamber of the SODA.

4. The method of claim 3, further comprising, before said rotating, detachably coupling the deployable object to the housing of the SODA and constraining the spring-loaded countermass within the chamber.

5. The method of claim 1, further comprising, after said detaching, carrying the at least one deployable object away from the SODA at a linear velocity translated from the selected radial velocity; and automatically expanding the spring-loaded countermass to maintain the harmony of the center of rotation and the center of mass of the SODA.

6. The method of claim 1, wherein the SODA is part of a rotatable satellite.

7. The method of claim 1, wherein the at least one deployable object comprises a plurality of deployable objects and the SODA comprises a plurality of deployment chambers and spring-loaded countermasses paired with associated ones of the plurality of deployable objects.

8. The method of claim 7, wherein at least two deployable objects have different mass.

9. The method of claim 7, wherein at least one of the plurality of deployable objects is a decoy device.

10. The method of claim 1, further comprising, after said detaching, activating the at least one deployable object to emit IR radiation as a decoy target.

* * * * *